(12) United States Patent
Du (10) Patent No.: US 9,940,177 B2
(45) Date of Patent: Apr. 10, 2018

(54) TRAFFIC CONTROL METHOD AND SYSTEM

(71) Applicant: BEIJING JINGDONG SHANGKE INFORMATION TECHNOLOGY CO, LTD., Haidian District, Beijing (CN)

(72) Inventor: Yufu Du, Beijing (CN)

(73) Assignee: Beijing Jingdong Shangke Information Technology Co., LTD., Haidian District, Beijing (CN)

( * ) Notice: Subject to any disclaimer, the term of this patent is extended or adjusted under 35 U.S.C. 154(b) by 0 days.

(21) Appl. No.: 15/038,144

(22) PCT Filed: Sep. 26, 2014

(86) PCT No.: PCT/CN2014/087622
§ 371 (c)(1),
(2) Date: May 20, 2016

(87) PCT Pub. No.: WO2015/085813
PCT Pub. Date: Jun. 18, 2015

(65) Prior Publication Data
US 2016/0292017 A1    Oct. 6, 2016

(30) Foreign Application Priority Data
Dec. 13, 2013    (CN) .......................... 2013 1 0683050

(51) Int. Cl.
*G06F 3/00*    (2006.01)
*G06F 9/44*    (2006.01)
(Continued)

(52) U.S. Cl.
CPC ................ *G06F 9/54* (2013.01); *H04L 47/74* (2013.01); *H04L 47/803* (2013.01); *H04L 47/808* (2013.01)

(58) Field of Classification Search
None
See application file for complete search history.

(56) References Cited

U.S. PATENT DOCUMENTS 6,237,024 B1 * 5/2001 Wollrath ................. G06F 9/485
709/203
7,234,139 B1 * 6/2007 Feinberg ............. G06F 9/45504
718/1
(Continued)

FOREIGN PATENT DOCUMENTS

| CN | 101577681 A | 11/2009 |
|---|---|---|
| CN | 102325148 A | 1/2012 |

(Continued)

OTHER PUBLICATIONS

International Search Report for Application No. PCT/CN2014/087622 dated Dec. 30, 2014 (9 pages).

*Primary Examiner* — Tuan Dao
*Assistant Examiner* — William C Wood
(74) *Attorney, Agent, or Firm* — Michael Best & Friedrich LLP (57) ABSTRACT

The present invention discloses a method and system for controlling traffic. The method for controlling traffic comprises: receiving, by a gateway, a request for invoking an internal application interface of the development platform from a client application; acquiring, by the gateway, rules for controlling the traffic, of the client application or the internal application interface; detecting, by the gateway, whether the rules for controlling the traffic are satisfied by the client application or the internal application interface; if so, admitting the request for invoking from the client application; otherwise, rejecting the request for invoking from the client application. The present invention prevents one same client application from excessively invoking an internal application through an internal application interface and prevents (Continued)

one same internal application from being invoked excessively, thereby reducing system resource consumption and improving system stability.

12 Claims, 3 Drawing Sheets (51) Int. Cl.
G06F 9/46 (2006.01)
G06F 13/00 (2006.01)
G06F 9/54 (2006.01)
H04L 12/911 (2013.01)
H04L 12/927 (2013.01)

(56) References Cited

U.S. PATENT DOCUMENTS 7,873,074 B1 * 1/2011 Boland ............... H04L 12/14 370/468
2007/0233883 A1 * 10/2007 De Lutiis ............ H04L 63/102 709/229
2010/0002586 A1 * 1/2010 Charzinski .......... H04L 41/5009 370/238
2012/0023375 A1 * 1/2012 Dutta ................. G06F 11/0754 714/47.2
2012/0180021 A1 * 7/2012 Byrd ..................... G06F 21/604 717/100
2013/0031201 A1 * 1/2013 Kagan .................... G01D 4/004 709/213
2013/0275578 A1 * 10/2013 Williams ............ H04L 43/0882 709/224

FOREIGN PATENT DOCUMENTS

CN 103051623 A 4/2013
CN 103701709 A 4/2014

* cited by examiner

TRAFFIC CONTROL METHOD AND SYSTEM

TECHNICAL FIELD

The present invention relates to the technical field of communication technology, and particularly to a method and system for controlling traffic.

BACKGROUND ART

An open platform is used for providing various internal applications for a client. Then, the client application is able to use the internal applications of the open platform by invoking an application interface of the open platform.

However, there might be following problems occurred when the internal applications of the open platform are invoked by a great number of client applications:

1. If one same client application makes too many or extraneous calls on the internal applications of a development platform, resources of the internal applications of the development platform which should be invoked by other clients might be occupied, which may lead to the distribution being imbalance;

2. In case that one same internal application is called heavily, since some internal applications are extremely system resource-consumed, once they are called heavily and extraneously, system is prone to a failure, and even to break down.

SUMMARY OF THE INVENTION

In view of this, due to, in the development platform in the prior art, lack of efficient traffic control conducted on the internal applications invoked by the client applications, it is necessary to provide a method and system for controlling traffic.

A method for controlling traffic, comprising:

receiving, by a gateway, a request for calling an internal application interface of the development platform from a client application;

acquiring, by the gateway, rules for controlling the traffic of the client application or the internal application interface;

detecting, by the gateway, whether the rules for controlling the traffic are satisfied by the client application or the internal application interface; if so, admitting the request for calling from the client application; otherwise, rejecting the request for calling from the client application.

A system for controlling traffic including a gateway and modules provided in the gateway, comprising:

a module for receiving a calling request, configured to receive a request for calling an internal application interface of the development platform from a client application;

a module for acquiring rules for traffic control, configured to acquire rules for controlling the traffic of the client application or the internal application interface;

a module for detecting traffic, configured to detect whether the rules for controlling the traffic are satisfied by the client application or the internal application interface; if so, admitting the request for calling from the client application; otherwise, rejecting the request for calling from the client application.

In the present invention, by means of creating traffic controlling rules for the internal application interface of the development platform or a client application, internal application interface is admitted to be invoked by a client application only in case that rules for controlling traffic are satisfied. By properly setting rules for controlling traffic, the client application calling the internal application interface is controlled, and thereby avoiding the situation that internal applications are excessively invoked by one same client application via internal application interface, and meanwhile avoiding a situation that one same internal application is invoked excessively. Therefore, consumption of system resource is reduced, and system stability is improved.

DESCRIPTION OF THE EMBODIMENTS

The detailed description is set forth below in connection with the appended drawings and specific embodiments.

Figure 1:
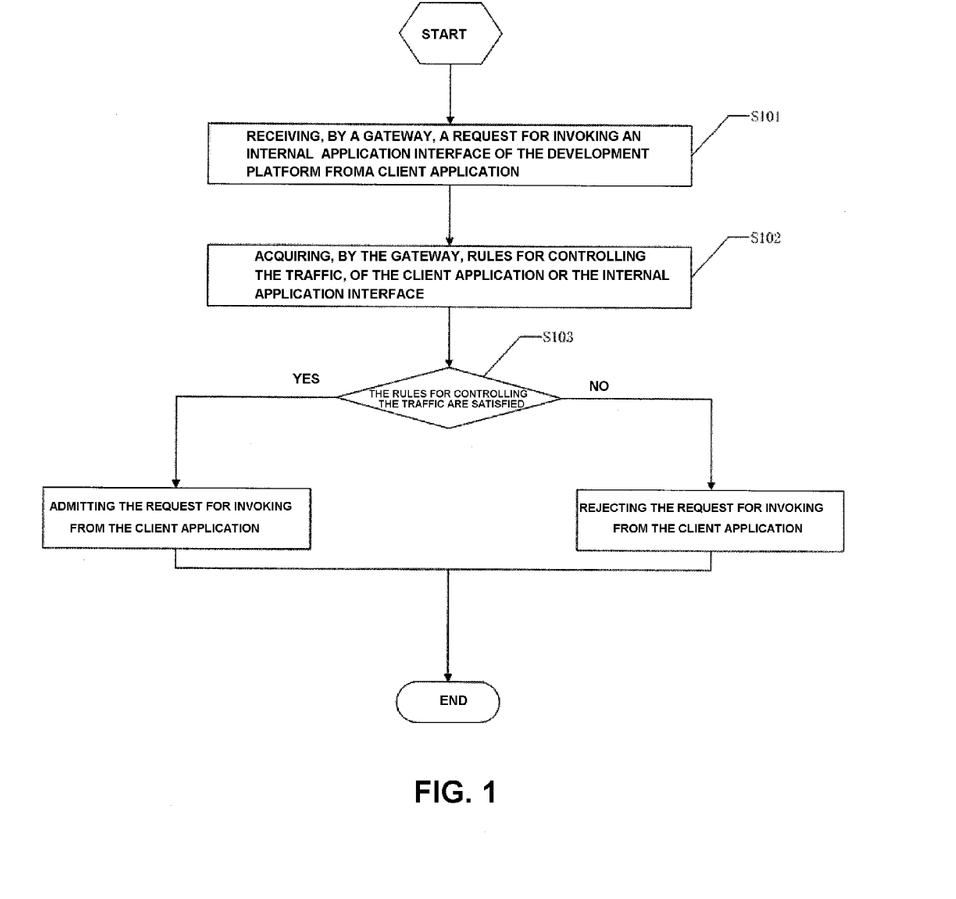
FIG. 1 is a workflow diagram of a method for controlling traffic according to the present invention.

As shown in FIG. 1, a workflow diagram of a method for controlling traffic according to the present invention, comprising:

Step S101, receiving, by a gateway, a request for calling an internal application interface of the development platform from a client application;

Step S102, acquiring, by the gateway, rules for controlling the traffic of the client application or the internal application interface;

Step S103, detecting, by the gateway, whether the rules for controlling the traffic are satisfied by the client application or the internal application interface; if so, admitting the request for calling from the client application; otherwise, rejecting the request for calling from the client application.

A gateway is an interface used for communicating with a client, and all requests from the clients are received through the gateway. When the client application needs to invoke an application interface, the gateway executes Step S102 to obtain corresponding rules for controlling traffic, wherein selecting rules for controlling traffic of the client application or rules for controlling traffic of the internal application interface, or rules for controlling traffic of both the client application and the internal application interface is decided by the gateway according to profile. In Step S102, the gateway obtains rules for controlling the traffic of the client application or the internal application interface, which comprises one of the following three cases:

Case I: obtaining rules for controlling traffic of the client application;

Case II: obtaining rules for controlling traffic of the internal application interface;

Case III: obtaining rules for controlling traffic of the client application and the internal application interface.

In one of the embodiments, rules for controlling traffic are:

during a period of time for counting invocations of a preset application, if the number of times the client application invokes does not exceed an upper threshold for invoking an application corresponding to the client application, rules for controlling traffic are satisfied; otherwise, rules for controlling traffic are not satisfied; or during a period of time for counting invocations of a preset application interface, if the number of times the internal application interface is invoked exceeds a threshold of an application interface corresponding to the internal application interface, rules for controlling traffic are satisfied; otherwise, rules for controlling traffic are not satisfied; or during a period of time for counting invocations of the internal application interface from a preset client application, if the number of times the client application invokes the internal application interface does not exceed an upper threshold for joint invocation corresponding to both the client application and the internal application interface, rules for controlling traffic are satisfied; otherwise, rules for controlling traffic are not satisfied.

This embodiment contains three kinds of rules for controlling traffic, and the gateway is able to select a combination of one or more of the rules with respect to different client applications and different internal application interfaces, according to a profile.

For example, for client application A calling application interface B, rules for controlling traffic can be selected as:

during a period of time for counting invocations of a preset application, if the number of invocation of a client application does not exceed an upper threshold for invoking an application corresponding to the client application, rules for controlling traffic are satisfied; otherwise, rules for controlling traffic are not satisfied.

At this time, only invocations from the client application are restricted, but the application interface is not restricted.

Alternately, rules for controlling traffic can be selected as:

during period of time for counting invocations of a preset application interface, if the number for invoking an internal application interface exceeds a threshold of an application interface corresponding to the internal application interface, rules for controlling traffic are satisfied; otherwise, rules for controlling traffic are not satisfied.

At this time, only invocations on the application interface are restricted, but the client application is not restricted.

Further, rules for controlling traffic can also be selected as the combination of the above two kinds of rules for controlling traffic, i.e., not only performing traffic restriction on the invocation from the client application but also restricting the invocation on the application interface.

More specifically, restriction on invocations of a specific application interface from a specific client application, i.e., rules for controlling traffic is:

during a period of time for counting invocations of internal application interface from a preset client application, if the number for invoking an internal application interface from a client application does not exceed an upper threshold for joint invocation corresponding to both the client application and internal application interface, rules for controlling traffic are satisfied; otherwise, rules for controlling traffic are not satisfied.

Wherein the period of time for counting invocations of a preset application, the period of time for counting invocations of a preset application interface and the period of time for counting invocations of internal application interface from a preset client application can be the same or different, and the period of times can be selected according to the practical requirement, such as one day, one hour or one minute.

One of the embodiments further comprises:

acquiring, by an analysis controlling system which communicates with the gateway, the number of times the client application invokes, by means of invocation on the access log for the gateway, if, during a period of time for counting invocations of the preset application, it is detected that the number of times the client application invokes exceeds a warning threshold for invoking an application corresponding to the client application, an email address of a contact of the client application is acquired and an warning email is sent to the email address of the contact, wherein the warning threshold for invoking an application is smaller than or equal to the upper threshold for invoking an application; or acquiring, by the analysis controlling system which communicates with the gateway, the number of times the client application invokes, by means of invocation on the access log for the gateway, if, during a period of time for counting invocations of the internal application interface from a preset client application, it is detected that the number of times the client application invokes the internal application interface exceeds a warning threshold for joint invocation corresponding to both the client application and the internal application interface, an email address of a contact of the client application is acquired and an warning email is sent to the email address of the contact, wherein the warning threshold for joint invocation is smaller than or equal to the upper threshold for joint invocation.

In this embodiment, if the number of times the client application invokes or the number of times the client application invokes the internal application interface exceeds a warning threshold, a warning email is sent to the contact of the client application. Then, if the contact decides to increase the threshold as necessary, an acknowledgement of the request for increasing can be sent to the gateway and the threshold is increase accordingly. With this embodiment, the threshold can be increased for a client application as needed.

One of the embodiments further comprises:

acquiring, by an analysis controlling system which communicates with the gateway, the number of times the client application invokes, by means of invoking the access log for the gateway, and calculating an estimated number of times the client application invokes during a period of time for estimating future increment; if the estimated number of times of invocations exceeds an upper threshold for invoking an application associated with the client application, the upper threshold for invoking an application is saved as an upper threshold of history invocation on the application, a program identification of the client application is taken as an identification of the application to be updated, the estimated number of times of invocations is taken as the upper threshold for invoking the application to be updated, a request for updating the upper threshold for invoking application is sent which includes the upper threshold for invoking the application to be updated and the identification of the corresponding application to be updated; then after the period of time for estimating increment elapses, if an acknowledgement of the request for increasing the upper threshold for invoking the application is not received, the upper threshold of history invocation on the application is taken as the upper threshold for invoking the application to be updated, and then said request for updating the upper threshold for invoking the application is sent;

if said request for updating the upper threshold for invoking the application sent from the analysis controlling system is received by the gateway, the upper threshold for invoking the application associated with the identification of the application to be updated is updated, as said the upper threshold for invoking the application to be updated;

if the acknowledgement of the request for increasing the upper threshold for invoking the application is received by the gateway, the request is forwarded to the analysis controlling system.

An analysis controlling system which communicates with the gateway acquires the number of times the client application invokes, by means of invoking the access log for the gateway, and calculates an estimated number of times the client application invokes during a period of time for estimating future increment. When it is found that the estimated number of times of invocations exceeds an upper threshold of invocations from an application, a request for updating the upper threshold for invocations from the application is sent to the gateway, and increment of the upper threshold of invocations from the application is suspended. Thereby, a situation can be avoided that the client application is not available due to reaching an upper limit. However, increment of the upper limit is not unrestricted. It is necessary for the client application to send an acknowledgement of request for increasing the upper threshold for invoking the application within a period of time, otherwise, the upper threshold of invocations from the application will be readjust to the threshold originally kept, and thus invocations from the client application is restricted.

One of the embodiments further comprises:

acquiring, by an analysis controlling system which communicates with the gateway, the number of times the client application invokes the internal application interface, by means of invoking the access log for the gateway, and calculating an estimated number of times the client application invokes the internal application interface during a period of time for estimating future increment; if the estimated number of times of invocations exceeds a preset upper threshold for joint invocation associated with the client application, the upper threshold for joint invocation is saved as an upper threshold for joint invocation, a program identification of the client application is taken as an identification of the application to be updated, the estimated number of times of invocations is taken as the upper threshold for joint invocation, a request for updating the upper threshold for joint invocation is sent which includes the upper threshold for joint invocation to be updated and the identification of the corresponding application to be updated; then after the period of time for estimating increment elapses, if an acknowledgement of the request for increasing the upper threshold for joint invocation is not received, the upper threshold of history joint invocation is taken as the upper threshold for joint invocation to be updated, and then said request for updating the upper threshold for i joint invocation is sent;

if said request for updating the upper threshold for joint invocation sent from the analysis controlling system is received by the gateway, the upper threshold for joint invocation associated with the identification of the application to be updated is updated, as said the upper threshold for joint invocation to be updated;

if the acknowledgement of the request for increasing the upper threshold for joint invocation is received by the gateway, the request is forwarded to the analysis controlling system.

In one of the embodiments, when the request for invocation of the client application is admitted by the gateway, the number of times the client application invokes is increased, and the number of times the internal application interface is invoked is increased, the number of times the client application invokes the internal application interface is increased, and the increased number of times are sent to a cluster counter which communicates with the gateway;

when the gateway detects whether the client application or the internal application interface satisfies the traffic control rules, acquiring from the cluster counter:

the number of times the client application invokes during a period of time for counting invocations of a preset application, or the number of times the internal application interface is invoked during a period of time for counting invocations of a preset application interface, or the number of times the client application invokes the internal application interface during a period of time for counting invocations of the internal application interface from a preset client application.

The number of times the client application invokes, the number of times the internal application interface is invoked and the number of times the client application invokes the internal application interface are all saved by the cluster counter, which can reduce the workload of the gateway.

One of the embodiments further comprises:

at least one thread is allocated to the application interface by the gateway and is set as an idle thread;

if the request for invocation of the client application is admitted by the gateway, detecting whether the internal application interface has an idle thread;

if the internal application interface has at least one idle thread, selecting one thread from among the idle threads of the internal application interface as a current thread, the internal application interface is invoked by the client application using the current thread, and setting the current thread as a working thread; when the client application finishes the invocation of the internal application interface, the current thread is set as an idle thread;

if the internal application interface does not have an idle thread, suspending the request for invocation of the client application, until the internal application interface has at least one idle thread.

Accordingly, the internal application interface can be restricted by threads, thereby a great number of parallel invocations on one same internal application interface can be avoided.

Figure 2:
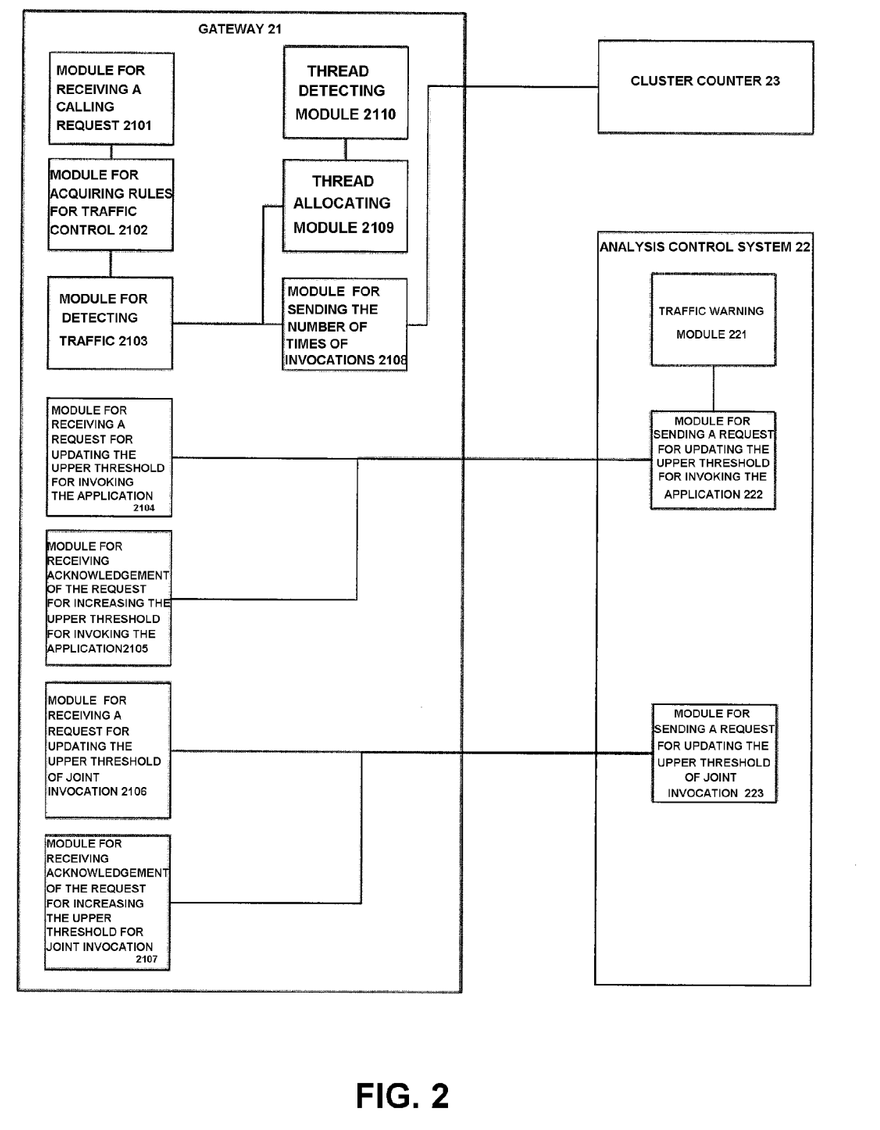
FIG. 2 is a structure module diagram of a system for controlling traffic according to the present invention.

FIG. 2 is a structure module diagram of a traffic control system of the present invention, comprising a gateway 21 and the modules provided in the gateway 21, comprising:

a module 2101 for receiving a calling request, configured to receive a request for calling an internal application interface of the development platform from a client application;

a module 2102 for acquiring rules for traffic control, configured to acquire rules for controlling the traffic of the client application or the internal application interface;

a module 2103 for detecting traffic, configured to detect whether the rules for controlling the traffic are satisfied by the client application or the internal application interface; if so, admitting the request for calling from the client application; otherwise, rejecting the request for calling from the client application.

In one of the embodiments, rules for controlling traffic are that:

during a period of time for counting invocations of a preset application, if the number of times the client application invokes does not exceed an upper threshold for invoking an application corresponding to the client application, rules for controlling traffic are satisfied; otherwise, rules for controlling traffic are not satisfied; or during a period of time for counting invocations of a preset application interface, if the number of times the internal application interface is invoked exceeds a threshold of an application interface corresponding to the internal application interface, rules for controlling traffic are satisfied; otherwise, rules for controlling traffic are not satisfied; or during a period of time for counting invocations of the internal application interface from a preset client application, if the number of times the client application invokes the internal application interface does not exceed an upper threshold for joint invocation corresponding to both the client application and the internal application interface, rules for controlling traffic are satisfied; otherwise, rules for controlling traffic are not satisfied.

One of the embodiments further comprises an analysis control system 22 which communicates with the gateway, and a traffic warning module 221 provided in the analysis control system 22, configured to acquire the number of times the client application invokes, by means of invocation on the access log for the gateway, if, during a period of time for counting invocations of a preset application, it is detected that the number of times the client application invokes exceeds a warning threshold for invoking an application corresponding to the client application, an email address of a contact of the client application is acquired and an warning email is sent to the email address of the contact, wherein the warning threshold for invoking an application is smaller than or equal to the upper threshold for invoking an application; or acquire the number of times the client application invokes, by means of invocation on the access log for the gateway, if, during a period of time for counting invocations of the internal application interface from a preset client application, it is detected that the number of times the client application invokes the internal application interface exceeds a warning threshold for joint invocation corresponding to both the client application and the internal application interface, an email address of a contact of the client application is acquired and an warning email is sent to the email address of the contact, wherein the warning threshold for joint invocation is smaller than or equal to the upper threshold for joint invocation.

One of the embodiments further comprises the analysis control system 22 which communicates with the gateway, and a module 222 for sending a request for updating the upper threshold for invoking the application provided in the analysis control system 22, and configured to acquire the number of times the client application invokes, by means of invoking the access log for the gateway, and calculate an estimated number of times the client application invokes during a period of time for estimating future increment; if the estimated number of times of invocations exceeds an upper threshold for invoking an application associated with the client application, the upper threshold for invoking an application is saved as an upper threshold of history invocation on the application, a program identification of the client application is taken as an identification of the application to be updated, the estimated number of times of invocations is taken as the upper threshold for invoking the application to be updated, a request for updating the upper threshold for invoking application is sent which includes the upper threshold for invoking the application to be updated and the identification of the corresponding application to be updated; then after the period of time for estimating increment elapses, if an acknowledgement of the request for increasing the upper threshold for invoking the application is not received, the upper threshold of history invocation on the application is taken as the upper threshold for invoking the application to be updated, and then said request for updating the upper threshold for invoking the application is sent.

a module 2104 for receiving a request for updating the upper threshold for invoking the application provided in the analysis control system, and configured to receive said request for updating the upper threshold for invoking the application sent from the analysis controlling system, and update the upper threshold for invoking the application associated with the identification of the application to be updated, as said the upper threshold for invoking the application to be updated;

a module 2105 for receiving acknowledgement of the request for increasing the upper threshold for invoking the application provided in the gateway 22, and configured to forward the received acknowledgement of the request for increasing the upper threshold for invoking the application to the analysis control system.

One of the embodiments further comprises the analysis control system 22 which communicates with the gateway, and a module 223 for sending a request for updating the upper threshold of joint invocation provided in the analysis control system 22, and configured to acquiring the number of times the client application invokes the internal application interface, by means of invoking the access log for the gateway, and calculating an estimated number of times the client application invokes the internal application interface during a period of time for estimating future increment; if the estimated number of times of invocations exceeds a preset upper threshold for joint invocation associated with the client application, the upper threshold for joint invocation is saved as an upper threshold for joint invocation, a program identification of the client application is taken as an identification of the application to be updated, the estimated number of times of invocations is taken as the upper threshold for joint invocation, a request for updating the upper threshold for joint invocation is sent which includes the upper threshold for joint invocation to be updated and the identification of the corresponding application to be updated; then after the period of time for estimating increment elapses, if an acknowledgement of the request for increasing the upper threshold for joint invocation is not received, the upper threshold of history joint invocation is taken as the upper threshold for joint invocation to be updated, and then said request for updating the upper threshold for joint invocation is sent;

a module 2106 for receiving a request for updating the upper threshold of joint invocation provided in the gateway 21, and configured to receive said request for updating the upper threshold for joint invocation sent from the analysis controlling system, and update the upper threshold for joint invocation associated with the identification of the application to be updated, as said the upper threshold for joint invocation to be updated;

a module 2107 for receiving acknowledgement of the request for increasing the upper threshold for joint invocation provided in the gateway 21, and configured to forward the received the acknowledgement of the request for increasing the upper threshold for joint invocation to the analysis control system.

One of the embodiments further comprises a module 2108 for sending the number of times of invocations provided in the gateway 21, and configured to, when the request for invocation of the client application is admitted, the number of times the client application invokes is increased, and the number of times the internal application interface is invoked is increased, the number of times the client application invokes the internal application interface is increased, and the increased numbers of times are sent to a cluster counter 23 which communicates with the gateway;

a traffic detecting module 2103 provided in the gateway 21, and configured to, when it detects whether the client application or the internal application interface satisfies the traffic control rules, acquire from the cluster counter 23:

the number of times the client application invokes during a period of time for counting invocations of a preset application, or the number of times the internal application interface is invoked during a period of time for counting invocations of a preset application interface, or the number of times the client application invokes the internal application interface during a period of time for counting invocations of the internal application interface from a preset client application.

One of the embodiments further comprises a thread allocating module 2109 provided in the gateway 21, and configured to allocate at least one thread to the application interface and set the at least one thread as an idle thread;

a thread detecting module 2110 provided in the gateway 21, and configured to detect whether the internal application interface has an idle thread, if the request for invocation of the client application is admitted:

if the internal application interface has at least one idle thread, select one thread from among the idle threads of the internal application interface as a current thread, the internal application interface is invoked by the client application using the current thread, and set the current thread as a working thread; when the client application finishes the invocation of the internal application interface, the current thread is set as an idle thread;

if the internal application interface does not have an idle thread, suspending the request for invocation of the client application, until the internal application interface has at least one idle thread.

Figure 3:
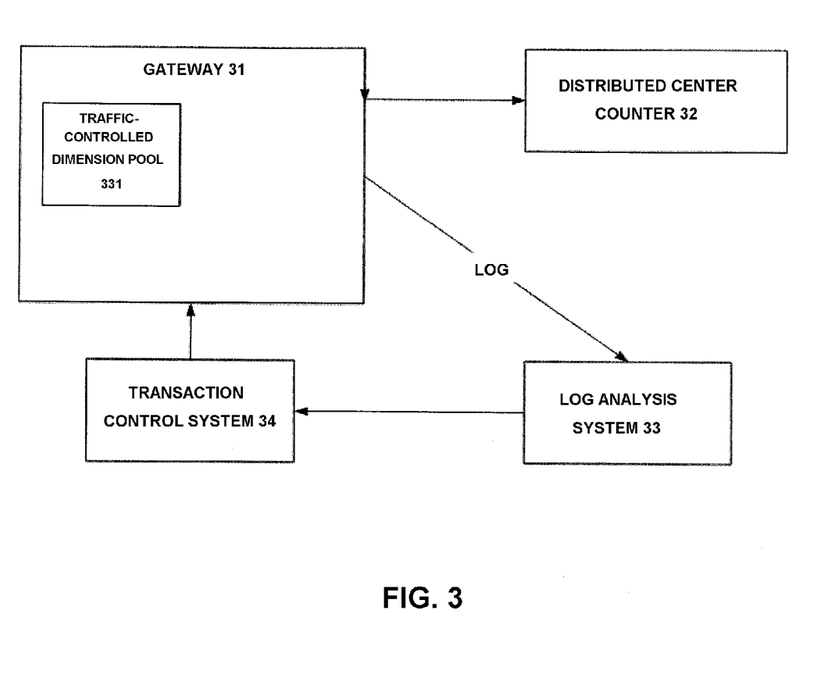
FIG. 3 is a structure diagram of one embodiment of the system for controlling traffic according to the present invention.

FIG. 3 is a structure diagram of one example of a traffic controlling system according to the present invention. The system comprises a gateway 31, a distributed center counter 32, a log analysis system 33 and a transaction control system 34.

Wherein, a traffic-controlled dimension pool 311 is provided in the gateway 31 which is dedicated in traffic control for invoking internal application interface from a client application. The distributed center counter 32 is used for saving the number of times the client application invokes, the number of times the internal application interface is invoked and the number of times the client application invokes the internal application interface.

Wherein, the log analysis system 33 and the transaction control system 34 together form the aforesaid analysis control system. The log analysis system 33 obtains logs from the gateway 31 for analyzing, and calculates whether the number of times the client application invokes exceeds a warning threshold for invoking an application corresponding to the client application during a period of time for counting invocations of the preset application, or whether the number of times the client application invokes the internal application interface exceeds a warning threshold for joint invocation corresponding to both the client application and the internal application interface during a period of time for counting invocations of the internal application interface from a preset client application. If so, it notifies the transaction control system 34 of sending a warning email.

Wherein, the period of time for counting invocations of the preset application and the period of time for counting invocations of the internal application interface from a preset client application are set to be one day.

Meanwhile, the log analysis system 33 acquires the number of times the client application invokes, and calculates an estimated number of times the client application invokes during a period of time for estimating future increment; acquires the number of times the client application invokes the internal application interface, and calculates an estimated number of times the client application invokes the internal application interface during a period of time for estimating future increment. Then, the transaction control system 34 decides whether to send to the gateway 31 an request for updating the upper threshold for invoking of application and a request for updating the upper threshold for joint invocation, based on the results of the calculations performed by the log analysis system 33. The period of time for estimating the increment is preferably set to be three days.

Accordingly, if the number of times of invocations from the client application exceeds the warning threshold of invocations of an application corresponding to the client application, or if the number of times of the client application invokes the internal application exceeds a warning threshold for joint invocation corresponding to both the client application and the internal application interface, a warning email will be sent. Moreover, the estimated number of times of invocations during a period of time for estimating future increment and the estimated number of times the client application invokes the internal application interface during a period of time for estimating future increment are calculated, the upper threshold of invocations from application and the upper threshold for joint invocation are increased properly, it temporarily allows the client application to use exceeding the upper limit, thereby avoiding affecting user experience. After the period of time for estimating increment, i.e., three days, if the client application does not acknowledge to increase the upper limit, the upper threshold of invocations from application and the upper threshold for joint invocation will be adjusted down to the previous values. Thus, the client application invoking the application interface is restricted.

The aforesaid embodiments only specify several modes of carrying out the present invention, are described specifically in detail, but cannot be understood as the restriction to the scope of the present patent for invention. It should be pointed out that those skilled in the art can make some transformations and improvements without departing from the conception of the present invention, and all those fall into the protection scope of the present invention. Therefore, the protection scope of the patent for invention should be subject to the claims attached.

What is claimed is:

1. A method for controlling traffic, characterized by comprising:

receiving, by a gateway, a request for invoking an internal application interface of a development platform from a client application;

acquiring, by the gateway, rules for controlling traffic from a set of stored rules, the set of stored rules including rules for controlling traffic of the client application, rules for controlling traffic of the internal application interface, and rules for controlling traffic of both the client application and the internal application interface by the gateway according to a profile;

detecting, by the gateway, whether the rules for controlling the traffic are satisfied by the client application or the internal application interface;

if so, admitting the request for invoking from the client application;

otherwise, ejecting the request for invoking from the client application, the rules for controlling traffic of the client application are that during a period of time for counting invocations of a preset application, if the number of times the client application invokes does not exceed an upper threshold for invoking an application corresponding to the client application, the rules for controlling traffic of the client application are satisfied; otherwise, the rules for controlling traffic of the client application are not satisfied;

the rules for controlling traffic of the internal application interface are that during a period of time for counting invocations of a preset application interface, if the number of times the internal application interface is invoked exceeds a threshold of an application interface corresponding to the internal application interface, the rules for controlling traffic of the internal application interface are satisfied; otherwise, the rules for controlling traffic of the internal application interface are not satisfied;

the rules for controlling traffic of both the client application and the internal application interface are that during a period of time for counting invocations of the internal application interface from a preset client application, if the number of times the client application invokes the internal application interface does not exceed an upper threshold for joint invocation corresponding to both the client application and the internal application interface, the rules for controlling traffic of both the client application and the internal application interface are satisfied; otherwise, the rules for controlling traffic of both the client application and the internal application interface are not satisfied.

2. The method for controlling traffic of claim 1, characterized in that the method further comprising:

acquiring, by an analysis controlling system which communicates with the gateway, the number of times the client application invokes, by means of invocation on the access log for the gateway, if, during a period of time for counting invocations of the preset application, it is detected that the number of times the client application invokes exceeds a warning threshold for invoking an application corresponding to the client application, an email address of a contact of the client application is acquired and an warning email is sent to the email address of the contact, wherein the warning threshold for invoking an application is smaller than or equal to the upper threshold for invoking an application; or acquiring, by the analysis controlling system which communicates with the gateway, the number of times the client application invokes, by means of invocation on the access log for the gateway, if, during a period of time for counting invocations of the internal application interface from a preset client application, it is detected that the number of times the client application invokes the internal application interface exceeds a warning threshold for joint invocation corresponding to both the client application and the internal application interface, an email address of a contact of the client application is acquired and an warning email is sent to the email address of the contact, wherein the warning threshold for joint invocation is smaller than or equal to the upper threshold for joint invocation.

3. The method for controlling traffic of claim 1, characterized in that the method further comprising:

acquiring, by an analysis controlling system which communicates with the gateway, the number of times the client application invokes, by means of invoking the access log for the gateway, and calculating an estimated number of times the client application invokes during a period of time for estimating future increment; if the estimated number of times of invocations exceeds an upper threshold of invocations of an application associated with the client application, the upper threshold for invoking an application is saved as an upper threshold of history invocation on the application, a program identification of the client application is taken as an identification of the application to be updated, the estimated number of times of invocations is taken as the upper threshold for invoking the application to be updated, a request for updating the upper threshold for invoking application is sent which includes the upper threshold for invoking the application to be updated and the identification of the corresponding application to be updated; then after the period of time for estimating increment elapses, if an acknowledgement of the request for increasing the upper threshold for invoking the application is not received, the upper threshold of history invocation on the application is taken as the upper threshold for invoking the application to be updated, and then said request for updating the upper threshold for invoking the application is sent;

if said request for updating the upper threshold for invoking the application sent from the analysis controlling system is received by the gateway, the upper threshold for invoking the application associated with the identification of the application to be updated is updated, as said the upper threshold for invoking the application to be updated;

if the acknowledgement of the request for increasing the upper threshold for invoking the application is received by the gateway, the request is forwarded to the analysis controlling system.

4. The method for controlling traffic of claim 1, characterized in that the method further comprising:

acquiring, by an analysis controlling system which communicates with the gateway, the number of times the client application invokes the internal application interface, by means of invoking the access log for the gateway, and calculating an estimated number of times the client application invokes the internal application interface during a period of time for estimating future increment; if the estimated number of times of invocations exceeds a preset upper threshold for joint invocation associated with the client application, the upper threshold for joint invocation is saved as an upper threshold for joint invocation, a program identification of the client application is taken as an identification of the application to be updated, the estimated number of times of invocations is taken as the upper threshold for joint invocation, a request for updating the upper threshold for joint invocation is sent which includes the upper threshold for joint invocation to be updated and the identification of the corresponding application to be updated; then after the period of time for estimating increment elapses, if an acknowledgement of the request for increasing the upper threshold for joint invocation is not received, the upper threshold of history joint invocation is taken as the upper threshold for joint invocation to be updated, and then said request for updating the upper threshold for joint invocation is sent;

if said request for updating the upper threshold for joint invocation sent from the analysis controlling system is received by the gateway, the upper threshold for joint invocation associated with the identification of the application to be updated is updated, as said the upper threshold for joint invocation to be updated;

if the acknowledgement of the request for increasing the upper threshold for joint invocation is received by the gateway, the request is forwarded to the analysis controlling system.

5. The method for controlling traffic of claim 1, characterized in that the method further comprising:

when the request for invocation of the client application is admitted by the gateway, the number of times the client application invokes is increased, and the number of times the internal application interface is invoked is increased, the number of times the client application invokes the internal application interface is increased, and the increased number of times are sent to a cluster counter which communicates with the gateway;

when the gateway detects whether the client application or the internal application interface satisfies the traffic control rules, acquiring from the cluster counter:

the number of times the client application invokes during a period of time for counting invocations of a preset application, or the number of times the internal application interface is invoked during a period of time for counting invocations of a preset application interface, or the number of times the client application invokes the internal application interface during a period of time for counting invocations of the internal application interface from a preset client application.

6. The method for controlling traffic of claim 1, characterized in that the method further comprising:

at least one thread is allocated to the application interface by the gateway and is set as an idle thread;

if the request for invocation of the client application is admitted by the gateway, detecting whether the internal application interface has an idle thread;

if the internal application interface has at least one idle thread, selecting one thread from among the idle threads of the internal application interface as a current thread, the internal application interface is invoked by the client application using the current thread, and setting the current thread as a working thread; when the client application finishes the invocation of the internal application interface, the current thread is set as an idle thread;

if the internal application interface does not have an idle thread, suspending the request for invocation of the client application, until the internal application interface has at least one idle thread.

7. A system for controlling traffic, characterized in that the system comprising:

a gateway configured to receive a calling request and receive a request for calling an internal application interface of a development platform from a client application;

acquire rules for traffic control from a set of stored rules, the set of stored rules including rules for controlling traffic of the client application or rules for controlling traffic of the internal application interface, and rules for controlling traffic of both the client application and the internal application interface by the gateway according to a profile;

detect traffic, detect whether the rules for controlling the traffic are satisfied by the client application or the internal application interface; if so, admitting the request for calling from the client application; otherwise, rejecting the request for calling from the client application, the rules for controlling traffic of the client application are that:

during a period of time for counting invocations of a preset application, if the number of times the client application invokes does not exceed an upper threshold for invoking an application corresponding to the client application, the rules for controlling traffic of the client application are satisfied; otherwise, the rules for controlling traffic of the client application are not satisfied;

the rules for controlling traffic of the internal application interface are that during a period of time for counting invocations of a preset application interface, if the number of times the internal application interface is invoked exceeds a threshold of an application interface corresponding to the internal application interface, the rules for controlling traffic of the internal application interface are satisfied; otherwise, the rules for controlling traffic of the internal application interface are not satisfied;

the rules for controlling traffic of both the client application and the internal application interface are that during a period of time for counting invocations of the internal application interface from a preset client application, if the number of times the client application invokes the internal application interface does not exceed an upper threshold for joint invocation corresponding to both the client application and the internal application interface, the rules for controlling traffic of both the client application and the internal application interface are satisfied; otherwise, the rules for controlling traffic of both the client application and the internal application interface are not satisfied.

8. The system for controlling traffic of claim 7, characterized in that the system further comprises an analysis control system which communicates with the gateway and is configured to acquire the number of times the client application invokes, by means of invocation on the access log for the gateway, if, during a period of time for counting invocations of a preset application, it is detected that the number of times the client application invokes exceeds a warning threshold for invoking an application corresponding to the client application, an email address of a contact of the client application is acquired and an warning email is sent to the email address of the contact, wherein the warning threshold for invoking an application is smaller than or equal to the upper threshold for invoking an application; or acquire the number of times the client application invokes, by means of invocation on the access log for the gateway, if, during a period of time for counting invocations of the internal application interface from a preset client application, it is detected that the number of times the client application invokes the internal application interface exceeds a warning threshold for joint invocation corresponding to both the client application and the internal application interface, an email address of a contact of the client application is acquired and an warning email is sent to the email address of the contact, wherein the warning threshold for joint invocation is smaller than or equal to the upper threshold for joint invocation.

9. The system for controlling traffic of claim 7, characterized in that the system further comprises an analysis control system which communicates with the gateway and is configured to send a request for updating the upper threshold for invoking the application provided in the analysis control system, and acquire the number of times the client application invokes, by means of invoking the access log for the gateway, and calculate an estimated number of times the client application invokes during a period of time for estimating future increment; if the estimated number of times of invocations exceeds an upper threshold for invoking an application associated with the client application, the upper threshold for invoking an application is saved as an upper threshold of history invocation on the application, a program identification of the client application is taken as an identification of the application to be updated, the estimated number of times of invocations is taken as the upper threshold for invoking the application to be updated, a request for updating the upper threshold for invoking application is sent which includes the upper threshold for invoking the application to be updated and the identification of the corresponding application to be updated; then after the period of time for estimating increment elapses, if an acknowledgement of the request for increasing the upper threshold for invoking the application is not received, the upper threshold of history invocation on the application is taken as the upper threshold for invoking the application to be updated, and then said request for updating the upper threshold for invoking the application is sent;

receive a request for updating the upper threshold for invoking the application provided in the analysis control system, and receive said request for updating the upper threshold for invoking the application sent from the analysis controlling system, and update the upper threshold for invoking the application associated with the identification of the application to be updated, as said the upper threshold for invoking the application to be updated;

receive acknowledgement of the request for increasing the upper threshold for invoking the application provided in the gateway, and forward the received acknowledgement of the request for increasing the upper threshold for invoking the application to the analysis control system.

10. The system for controlling traffic of claim 7, characterized in that the system further comprises an analysis control system which communicates with the gateway and is configured to send a request for updating the upper threshold of joint invocation provided in the analysis control system, and acquire the number of times the client application invokes the internal application interface, by means of invoking the access log for the gateway, and calculating an estimated number of times the client application invokes the internal application interface during a period of time for estimating future increment; if the estimated number of times of invocations exceeds a preset upper threshold for joint invocation associated with the client application, the upper threshold for joint invocation is saved as an upper threshold for joint invocation, a program identification of the client application is taken as an identification of the application to be updated, the estimated number of times of invocations is taken as the upper threshold for joint invocation, a request for updating the upper threshold for joint invocation is sent which includes the upper threshold for joint invocation to be updated and the identification of the corresponding application to be updated; then after the period of time for estimating increment elapses, if an acknowledgement of the request for increasing the upper threshold for joint invocation is not received, the upper threshold of history joint invocation is taken as the upper threshold for joint invocation to be updated, and then said request for updating the upper threshold for joint invocation is sent;

receive a request for updating the upper threshold of joint invocation provided in the gateway, and receive said request for updating the upper threshold for joint invocation sent from the analysis controlling system, and update the upper threshold for joint invocation associated with the identification of the application to be updated, as said the upper threshold for joint invocation to be updated;

receive acknowledgement of the request for increasing the upper threshold for joint invocation provided in the gateway, and forward the received the acknowledgement of the request for increasing the upper threshold for joint invocation to the analysis control system.

11. The system for controlling traffic of claim 7, characterized in that the gateway is further configured to send the number of times of invocations provided in the gateway, and configured to, when the request for invocation of the client application is admitted, the number of times the client application invokes is increased, and the number of times the internal application interface is invoked is increased, the number of times the client application invokes the internal application interface is increased, and the increased numbers of times are sent to a cluster counter which communicates with the gateway;

and wherein the gateway is further configured to, when it detects whether the client application or the internal application interface satisfies the traffic control rules, acquire from the cluster counter:

the number of times the client application invokes during a period of time for counting invocations of a preset application, or the number of times the internal application interface is invoked during a period of time for counting invocations of a preset application interface, or the number of times the client application invokes the internal application interface during a period of time for counting invocations of the internal application interface from a preset client application.

12. The system for controlling traffic of claim 7, characterized in that the gateway is further configured to allocate at least one thread to the application interface and set the at least one thread as an idle thread;

detect whether the internal application interface has an idle thread, if the request for invocation of the client application is admitted:
if the internal application interface has at least one idle thread, select one thread from among the idle threads of the internal application interface as a current thread, the internal application interface is invoked by the client application using the current thread, and set the current thread as a working thread; when the client application finishes the invocation of the internal application interface, the current thread is set as an idle thread;
if the internal application interface does not have an idle thread, suspending the request for invocation of the client application, until the internal application interface has at least one idle thread.

* * * * *